United States Patent [19]

Hodge

[11] Patent Number: 5,740,300
[45] Date of Patent: Apr. 14, 1998

[54] TRANSCEIVER MODULE SUPPORT APPARATUS WITH FIBER MANAGEMENT FEATURES

[75] Inventor: Ronald L. Hodge, Flowery Branch, Ga.

[73] Assignee: Scientific-Atlanta, Inc., Norcross, Ga.

[21] Appl. No.: 640,707

[22] Filed: May 1, 1996

[51] Int. Cl.[6] .................................................. G02B 6/00
[52] U.S. Cl. ............................ 385/135; 385/88; 385/89; 385/134
[58] Field of Search ................................. 385/134, 135, 385/136, 88, 89, 92, 93

[56] References Cited

U.S. PATENT DOCUMENTS

| D. 346,546 | 5/1994 | Tesmar, Jr. ................... D8/356 |
| 3,883,201 | 5/1975 | Busoni ...................... 174/135 X |
| 4,165,592 | 8/1979 | Blankenship ..................... 52/220 |
| 4,861,134 | 8/1989 | Alameel et al. ............. 385/135 X |
| 4,932,744 | 6/1990 | Messelhi ................... 385/135 X |
| 4,961,623 | 10/1990 | Midkiff et al. ............. 385/100 X |
| 5,100,221 | 3/1992 | Carney et al. ................. 385/135 |
| 5,115,489 | 5/1992 | Norris ....................... 385/135 |
| 5,142,606 | 8/1992 | Carney et al. ................. 385/134 |
| 5,167,001 | 11/1992 | Debortoli et al. ............. 385/135 |
| 5,212,761 | 5/1993 | Petrunia ..................... 385/135 |
| 5,222,183 | 6/1993 | Daems et al. ................. 385/135 |
| 5,237,640 | 8/1993 | Pedraza et al. ............... 385/136 |
| 5,241,617 | 8/1993 | Peacock et al. ............... 385/135 |
| 5,253,320 | 10/1993 | Takahashi et al. ............. 385/135 |
| 5,285,515 | 2/1994 | Milanowski et al. ............ 385/135 |
| 5,335,349 | 8/1994 | Kutsch et al. ............. 385/134 X |
| 5,353,367 | 10/1994 | Czosnowski et al. ............ 385/135 |
| 5,375,185 | 12/1994 | Hermsen et al. ............... 385/135 |
| 5,402,515 | 3/1995 | Viadocovich et al. ........... 385/135 |
| 5,412,497 | 5/1995 | Kaetsu et al. ................ 359/163 |
| 5,421,532 | 6/1995 | Richter .................... 242/399.2 |
| 5,442,726 | 8/1995 | Howard et al. ................ 385/135 |
| 5,457,763 | 10/1995 | Kerry et al. ................. 385/135 |
| 5,469,526 | 11/1995 | Rawlings .................... 385/135 |
| 5,497,444 | 3/1996 | Wheeler ..................... 385/135 |
| 5,515,200 | 5/1996 | Delrosso et al. .............. 359/341 |

FOREIGN PATENT DOCUMENTS

3-231204  10/1991  Japan ................... 385/135 X

*Primary Examiner*—Brian Healy
*Attorney, Agent, or Firm*—Kenneth M. Massaroni; John Victor Pezdek

[57] ABSTRACT

A transceiver module support apparatus comprising a support tray received in a chassis. The tray is specially configured for receiving and supporting a plurality of modules with a front portion of the tray including cable routing and supporting features with curved contours of predetermined bending radii to prevent excessive bending or twisting of the cables. The guide portions have smooth contours with the desired bending radii extending in at least two directions to allow for different cable routing. The tray also includes integral structural features for mounting cooling fan units and interconnecting them.

19 Claims, 10 Drawing Sheets

TRANSCEIVER MODULE SUPPORT APPARATUS WITH FIBER MANAGEMENT FEATURES

FIELD OF THE INVENTION

The present invention relates to a module support for a fiber optic transmitter/receiver chassis, and more particularly to a base tray for supporting and aligning the modules in the chassis and providing fiber management features, as well as fan support and a plenum chamber for cooling air.

BACKGROUND OF THE INVENTION

Fiber optic transceiver modules are generally mounted with appropriate hardware in a housing and are engaged to connectors on one side of the modules. The modules must be placed properly in the chassis for this connection to be made, and once the modules are positioned, RF coaxial cables are connected to the front of the modules. The transceiver modules have fiber optic connectors along a front side into which fiber optic cables are inserted. Due to the brittle nature of fiber optic cables, excessive bending or twisting can damage them and severely impair their functioning or break them altogether. Allowing fiber optic cables to be become tangled or handling them like metal wire cables leaves them suspectable to breakage or signal loss. In conventional devices no provision is made for managing the optic fibers to ensure proper routing and protection against excessive bending. In addition, normal convection is typically relied upon for cooling transceiver modules in a rack environment. An additional blower is used if the power, and therefore the heat, inside the rack warrants the supplemental cooling. This requirement has severely limited the amount of power a typical chassis can accommodate while occupying more space.

Therefore, a need exists for a fiber optic transceiver module chassis that facilitates alignment of the transceiver modules in the chassis and provides fiber management features as well as integral support for cooling fans on the chassis.

SUMMARY OF THE INVENTION

Accordingly, it is a principal object of the invention to provide a structural component to a module chassis which supports and guides transceiver modules into the chassis, while engaging connectors to one side of the chassis.

Another object of the present invention is to provide fiber management features which route fiber cables to each module and maintains a specific bend radius for the fiber.

Yet another object of the present invention is to provide integral support for cooling fans within the module chassis to economize space requirements.

The transceiver module support apparatus of the present invention comprises a support tray received in a chassis, the tray configured for receiving and supporting a plurality of modules. The tray includes a front portion having cable routing and supporting features with curved contours of predetermined bending radii to prevent excessive bending or twisting of the cables. The guide portions have smooth contours with the desired bending radii extending in at least two directions to allow for different cable routing. The tray also includes integral structural features for mounting cooling fan units and interconnecting them.

These and other features and advantages of the invention may be more completely understood from the following detailed description of the preferred embodiment of the invention with reference to the accompanying drawings.

DETAILED DESCRIPTION OF THE PREFERRED EMBODIMENTS

Figure 1:
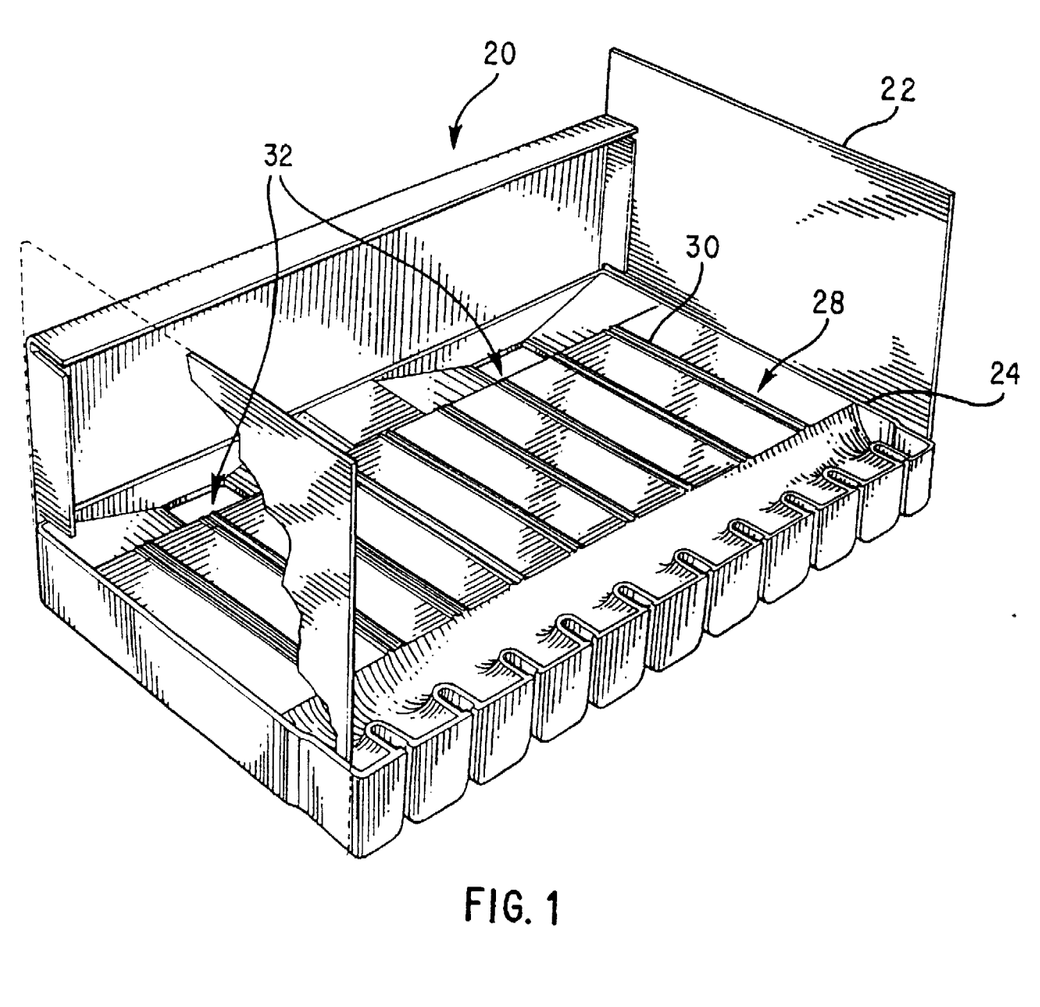
FIG. 1 is a perspective view of a module chassis and module support tray in accordance with the present invention.
Figure 2:
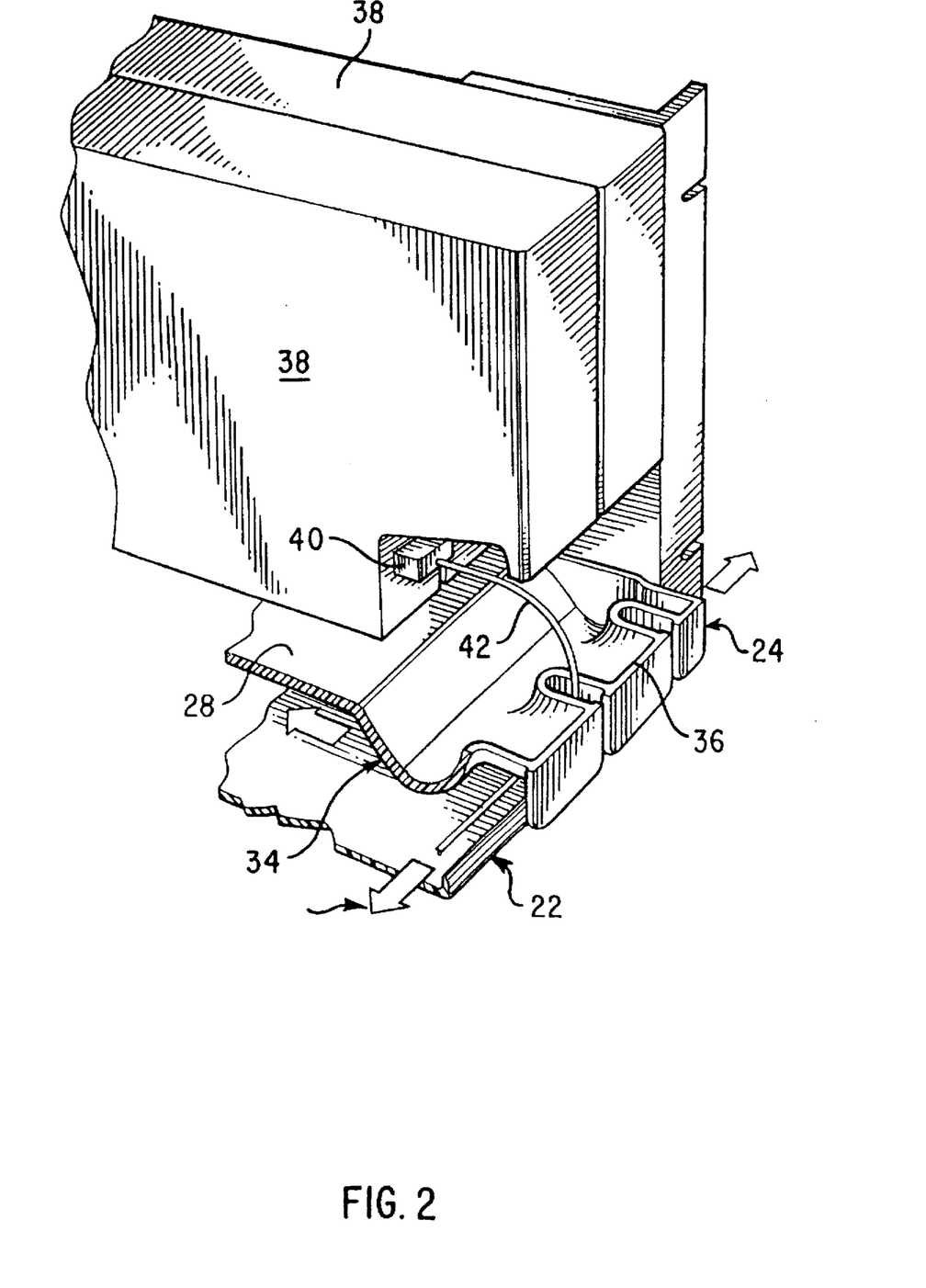
FIG. 2 is perspective view of a portion of the chassis and tray shown with a module mounted thereon.
Figure 3:
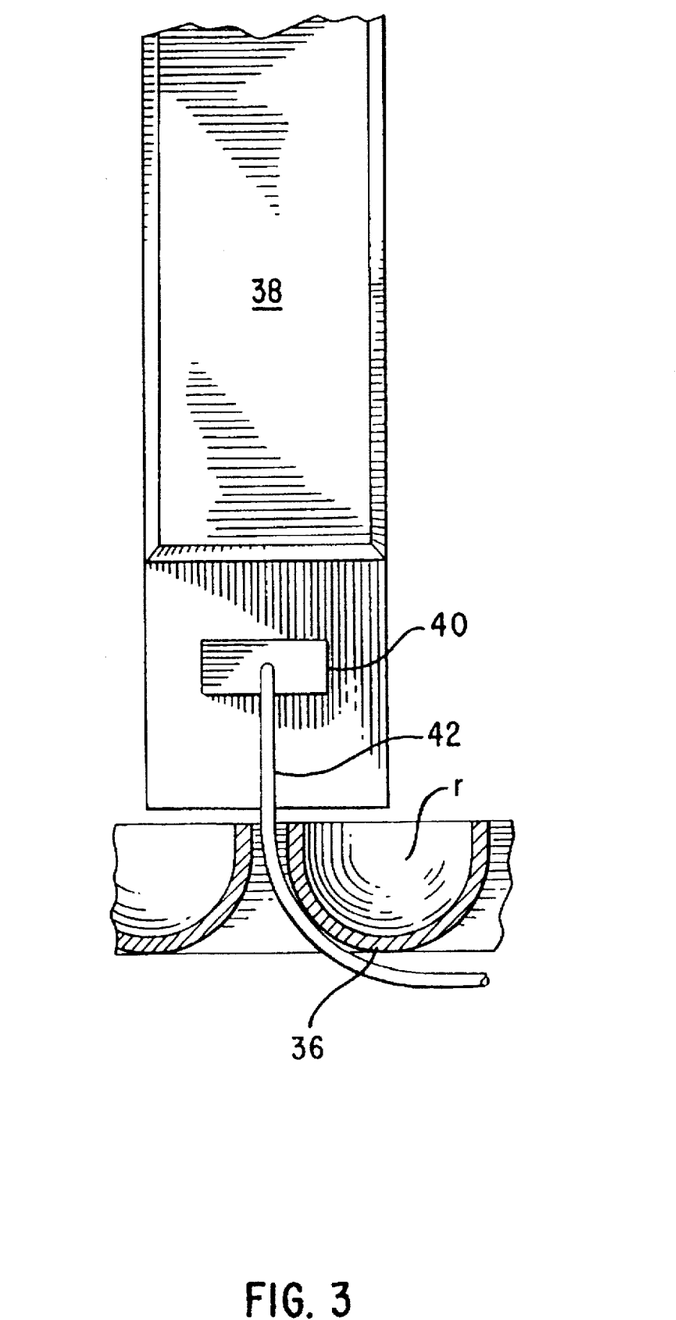
FIG. 3 is a front elevational view of a portion of the chassis, tray and module shown in FIG. 2.
Figure 4:
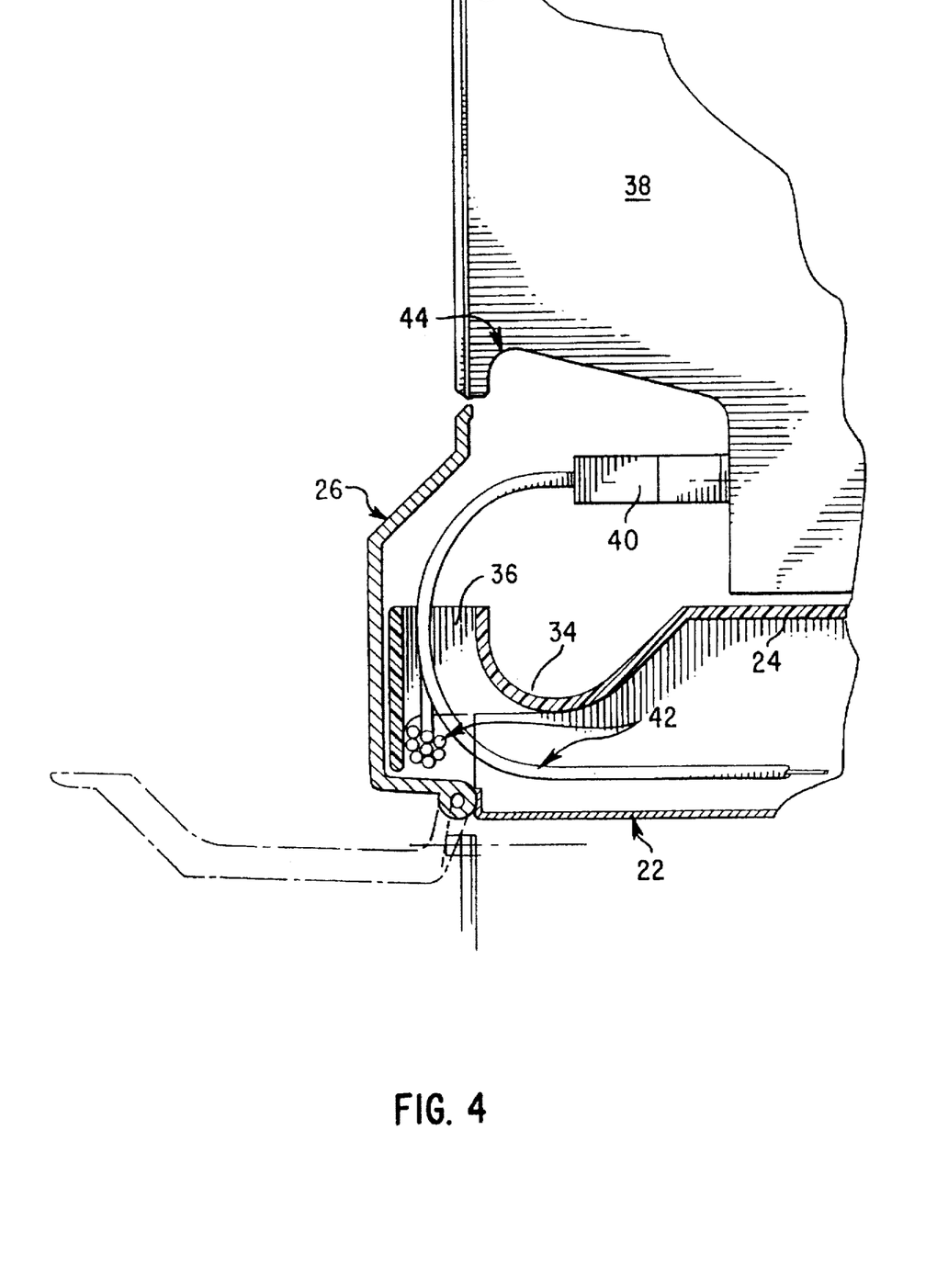
FIG. 4 is side cross-sectional view of the chassis, tray and module shown in FIG. 3.

Referring to FIGS. 1–4, a module support apparatus 20 comprising a chassis 22, a three sided structure preferably formed from sheet metal, and a support tray 24 for receiving and supporting thereon transceiver modules. Tray 24 is preferably plastic and formed by injection molding. Chassis 22 and tray 24 are configured so that the tray is matingly received in the chassis to facilitate assembly and operation. The open fourth side of chassis 22 of FIG. 1 may include a pivoting door or gate 26 as shown in FIGS. 3 and 4.

Tray 24 can be configured in a variety of ways with the following structural requirements: module support area 28, a plurality of module guides 30, vents 32 in the rear portion, and a fiber guide area 34 in the front portion. Fiber guide area 34 includes a plurality of fiber guides 36 which correspond in placement to module guides 30.

FIGS. 2–4 illustrate, in detail, a portion of fiber guide area 34 and exemplary fiber guides 36 with modules 38 mounted on module support area 28 of tray 24. The front portion of each module 38 includes a fiber optic cable connection jack 40 into which cable 42 is inserted. To ensure that cable 42 is routed properly to its jack 40 without excessive bending or twisting, fiber guide area 34 is configured with smooth contours of specific bending radii about which fiber optic cable 42 can be guided. Once modules 38 are slide-guided into place on tray 24 and cables 42 guided by the contours of tray 24 are connected to the modules via jacks 42, door 26 can be raised to cover the connections. Modules 38 may include relieved grip areas 44 to facilitate handling. As best seen in FIGS. 3 and 4, cables 42 can be guided either straight out or to the side since tray 24 is contoured in both directions.

Figure 5:
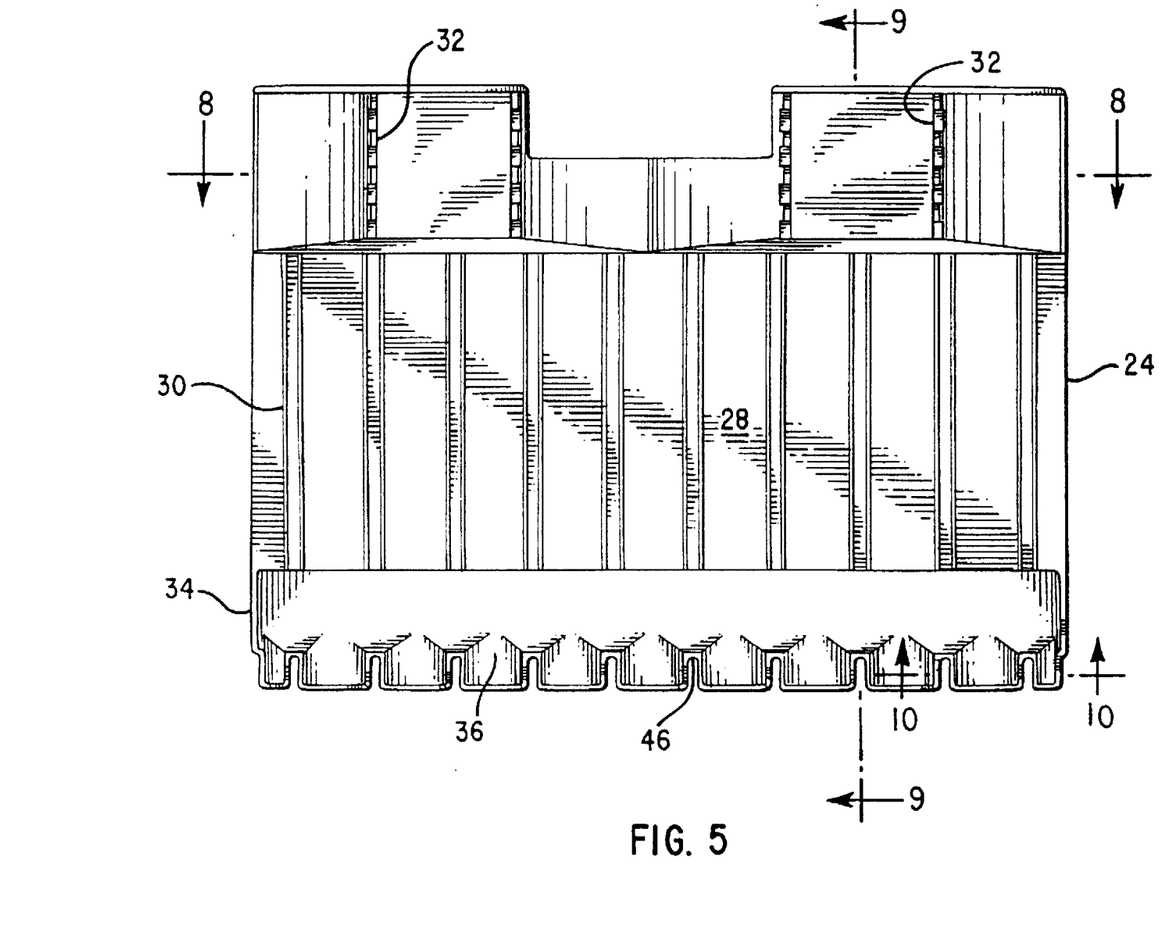
FIG. 5 is a top plan view of a first preferred embodiment of the tray of the present invention.
Figure 6:
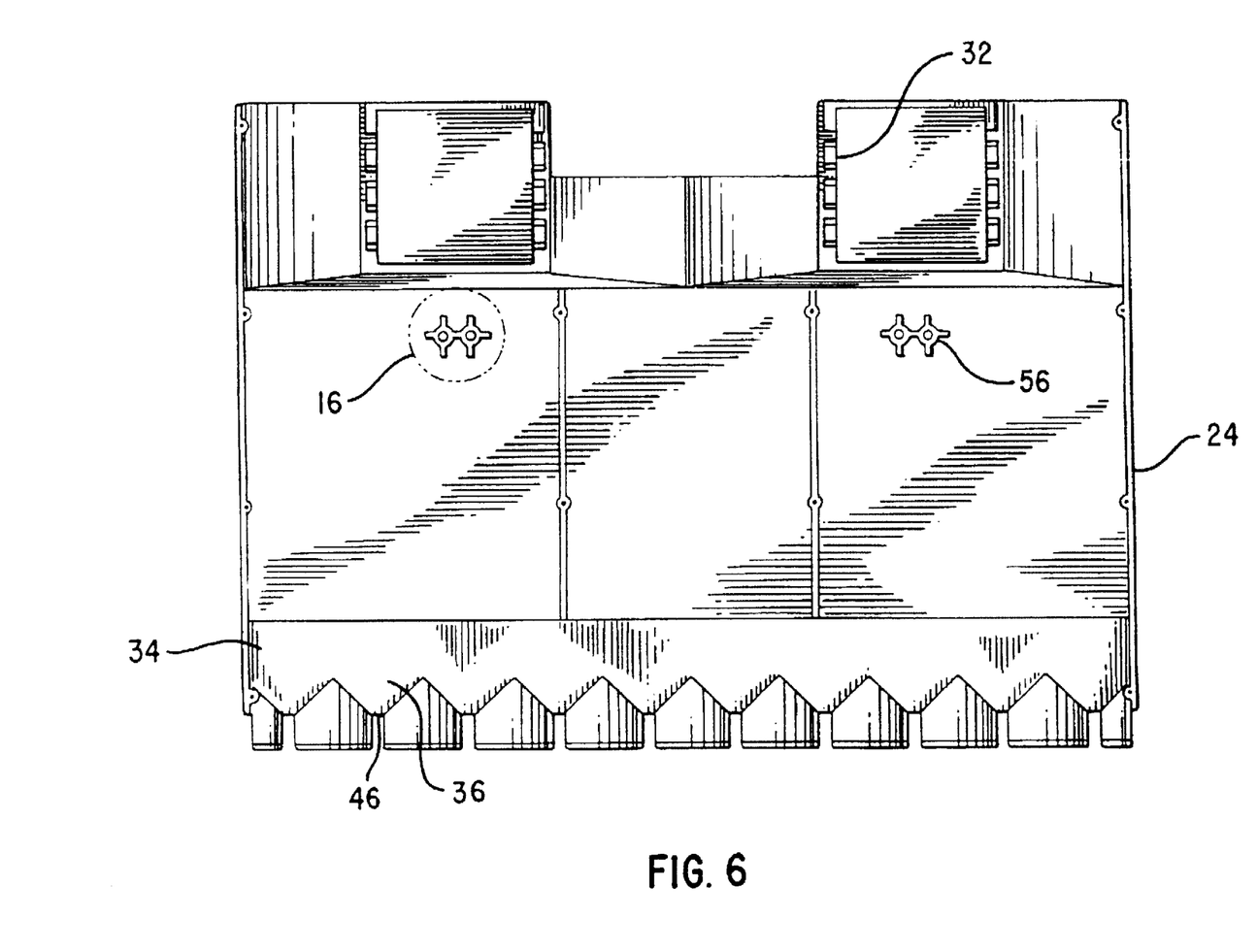
FIG. 6 is a bottom plan view of the tray shown in FIG. 5.
Figure 9:
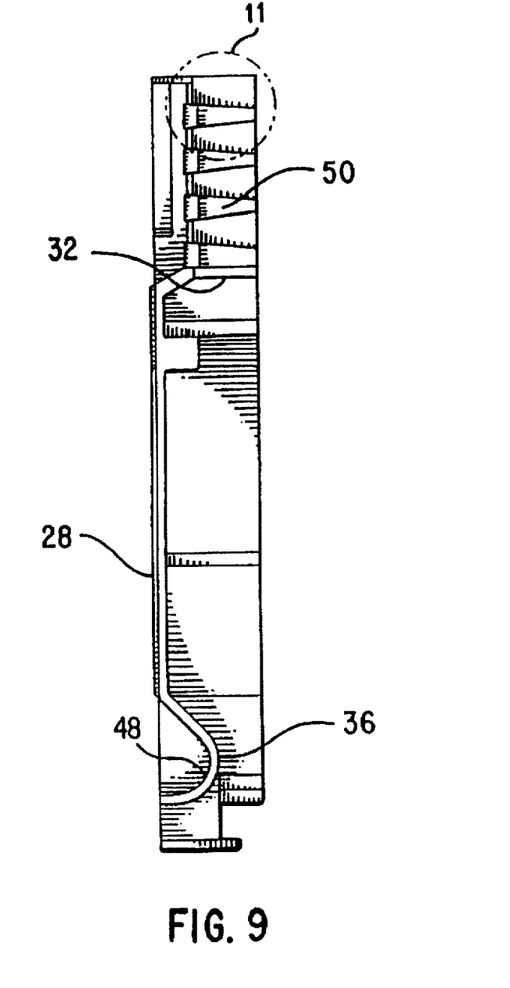
FIG. 9 is a cross-sectional view of the tray taken along line 9—9 of FIG. 5.
Figure 10:
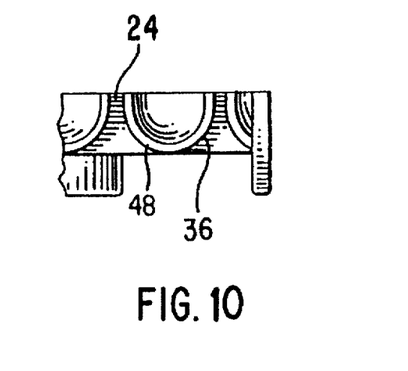
FIG. 10 is a cross-sectional view of the tray taken along line 10—10 of FIG. 5.

FIGS. 5–17 illustrate a tray 24 in accordance with a preferred embodiment of the present invention. The top plan view of tray 24 of FIG. 5 illustrates module support area 28 and module guides 30 which are elongated slots into which a tabbed portion of a module (not shown) are slid. The rearward entry portions of the module guides are beveled to facilitate positioning of a module. Fiber guide area 34 extends across the rear portion of tray 24 and includes a plurality of fiber guides 36 which correspond in number to the module guides. Cables can be brought upward through guide slots 46. FIG. 6 illustrates the underside of tray 24 and shows the tapered portions of the module guide area 34. As can be seen in FIGS. 9 and 10, module guides 36 have rounded corners 48 on the lower surfaces, a rounded underside surface and rounded side surfaces to prevent sharp bending of fibers in all directions. The preferred bending radii of these surfaces are in the range of 1.00 inch to 1.50 inches.

Figure 7:
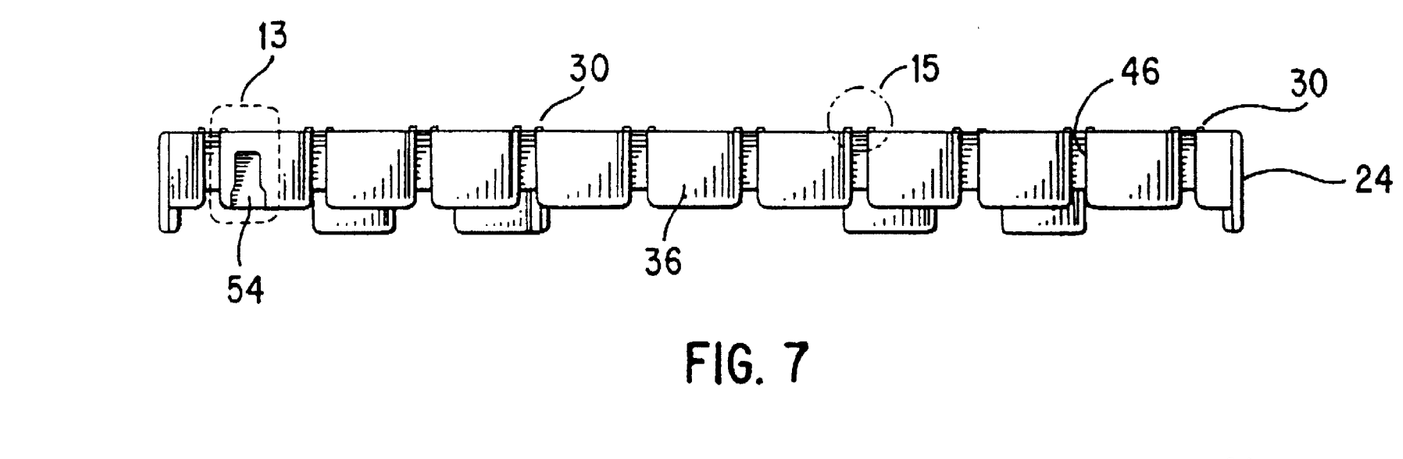
FIG. 7 is a front elevational view of the tray shown in FIG. 5.
Figure 8:
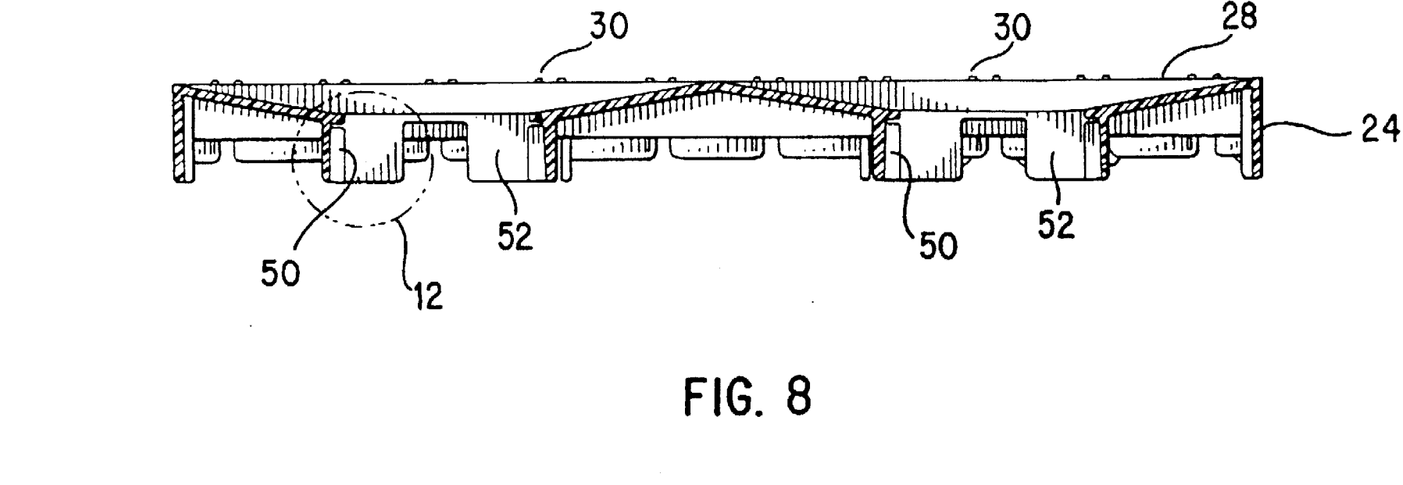
FIG. 8 is a rear elevational view of the tray shown in FIG. 5.
Figure 11:
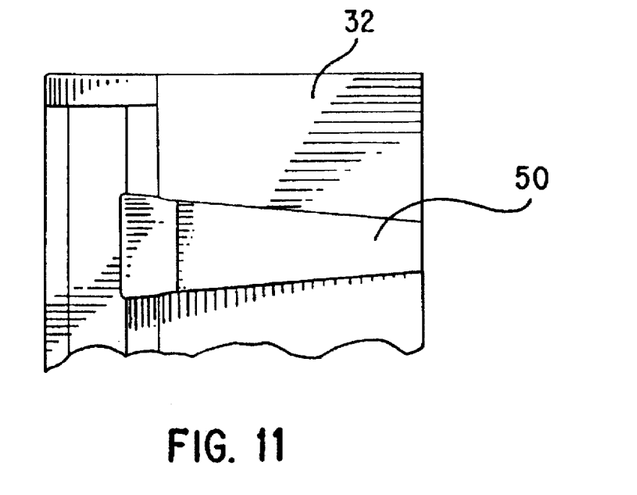
FIG. 11 is a detailed view of the area marked 11 in FIG. 9.
Figure 12:
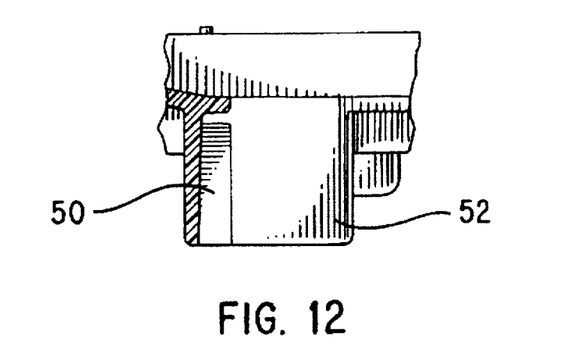
FIG. 12 is a detailed view of the area marked 12 in FIG. 8.
Figure 13:
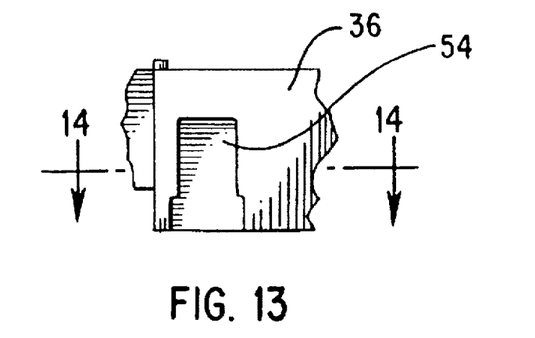
FIG. 13 is a detailed view of the area marked 13 in FIG. 7.
Figure 14:
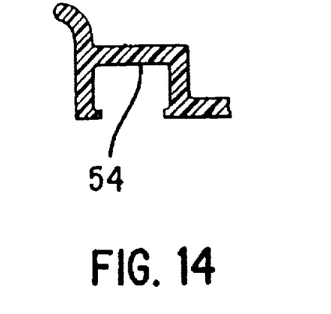
FIG. 14 is a cross section taken along line 14—14 of FIG. 13.
Figure 15:
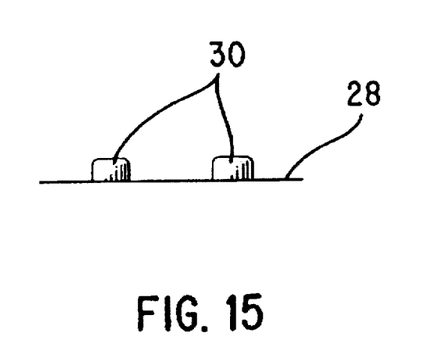
FIG. 15 is detailed view of the area marked 15 in FIG. 7.
Figure 16:
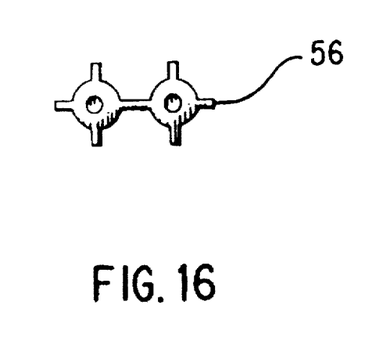
FIG. 16 is a detailed view of the area marked 16 in FIG. 6.

FIGS. 11–17 illustrate various details of tray 24. FIG. 11 illustrates a portion of a side surface of vent 32 as shown in FIG. 9, and in particular, a series of tabs 50 to slidingly engage a fan unit (not shown) which can be mounted therein. Tabs 50 are preferably tapered as shown in FIG. 9 to simply manufacture by injection molding. FIG. 12 is a detail of the area indicated in FIG. 8 and illustrates a tab 50 and an endwall 52 of vent 32. Endwalls 52 are also shown in FIG. 8, and provide an abutment for a fan unit. FIGS. 13 and 14 are detailed views of cutout keyhole 54 provided on the front surface of a fiber guide 36 which is located at an end of fiber guide area 34 as shown in FIG. 7. The keyhole is adapted to receive a modular telephone jack which may be installed for status lines. FIG. 15 is a detailed view of a module guide 30 as shown in FIG. 7. A guide is comprised of two parallel raised ribs on module support surface 28. FIG. 16 is a detailed bottom plan view of a boss 56 that is also shown in FIG. 6. Boss 56 is integrally formed on the underside of tray 24 and is employed in mounting a fan unit to the tray.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

I claim:

1. An apparatus for supporting a plurality of electronic modules and routing and guiding optic fiber cables thereto, said apparatus comprising:
    a chassis; and
    a support tray matingly received in said chassis, said tray comprising
        a plurality of module guide means for guiding the modules into proper position on a first side of said tray,
        cable guiding and routing means for guiding and routing a cable from a second side of said tray to a connector of each of the modules arranged on said first side, said cable guiding and routing means including a smoothly contoured surface of a predetermined bending radii to prevent excessive bending, twisting and tangling of the cable.

2. The apparatus of claim 1, wherein said cable guiding and routing means comprises a plurality of individual fiber guides and guide slot, said fiber guides each including said smoothly contoured surface of a predetermined bending radii.

3. The apparatus of claim 2, wherein each of said module guide means are aligned with a corresponding one of said fiber guides and said guide slots so that cables for each of the modules are guided along said corresponding fiber guides and guide slots to the connector of the modules.

4. The apparatus of claim 1, wherein said predetermined bending radii is in the range of 1.0 inch to 1.5 inches.

5. The apparatus of claim 1, wherein said support tray further comprises an integral cooling fan support area.

6. The apparatus of claim 5, further comprising a vent in communication with said cooling fan support area.

7. The apparatus of claim 6, further comprising an integral tab on said cooling fan support area for engaging a cooling fan housing.

8. The apparatus of claim 1, wherein said chassis is rectangular including three integral walls surrounding said support tray and a pivoting gate along an open fourth side.

9. A tray for use in a chassis for supporting a plurality of electronic modules and routing and guiding fiber optic cables associated with each of the modules to connectors on the modules, said tray comprising:
    a module support area;
    a fiber guide area disposed along a first side of said module support area;
    a cooling fan support area disposed along a second side of said module support area;
    a plurality of module guides for guiding the modules into proper position on said tray;
    a cable routing guide associated with each of said module guides for guiding and routing the fiber optic cables to the connectors, said cable routing guide comprising smoothly contoured surfaces of predetermined bending radii to prevent excessive bending, twisting and tangling of the cables.

10. The tray of claim 9, wherein said module guides are disposed so that the modules are slid into position from said first side toward said second side with the connectors finally disposed along said first side to be adjacent said cable routing guides.

11. The tray of claim 9, wherein said cable routing guides further comprise guide slots along said first side for leading the cables to the connectors of the modules.

12. The tray of claim 11, wherein said contoured surfaces of said cable routing guides are contoured to guide the cables from underneath said module support area toward said first side and upward through said guide slots.

13. The tray of claim 11, wherein said contoured surfaces of said cable routing guides are contoured to guide the cables from underneath said module support area and generally parallel to said first side toward said first side and upward through said guide slots.

14. The tray of claim 9, further comprising an integral engagement tab on said cooling fan support area for engaging a cooling fan housing.

15. The tray of claim 9, further comprising a vent provided in said cooling fan support area.

16. The tray of claim 14, further comprising a vent provided in said cooling fan support area.

17. A method of guiding and routing optic fiber cables in a transceiver chassis from their connectors in individual transceiver modules positioned on a first side of a support tray received in the chassis to a location on a second side of the support tray, said method comprising the steps of:

guiding the cables from their connectors through guide slots provided along a first edge of the tray;

leading the cables along a smoothly contoured surface of a predetermined bending radius provided adjacent the guide slots and on said second side of the tray, the bending radius selected to prevent excessive bending, twisting and tangling of the cables;

routing the cables to a location on said second side of the tray.

18. The method of claim 17, wherein said step of leading the cables along the contoured surface comprises leading the cables in a direction parallel to the first edge.

19. The method of claim 17, wherein said step of leading the cables along the contoured surface comprises leading the cables in a direction perpendicular to the first edge.

* * * * *